(12) United States Patent
You et al.

(10) Patent No.: US 12,732,324 B2
(45) Date of Patent: Sep. 8, 2026

(54) METHODS AND APPARATUS FOR CONFIGURING A REFERENCE SIGNAL

(71) Applicant: GUANGDONG OPPO MOBILE TELECOMMUNICATIONS CORP., LTD., Dongguan (CN)

(72) Inventors: Xin You, Dongguan (CN); Qianxi Lu, Dongguan (CN); Bingxue Leng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 266 days.

(21) Appl. No.: 18/384,483

(22) Filed: Oct. 27, 2023

(65) Prior Publication Data

US 2024/0072966 A1 Feb. 29, 2024

Related U.S. Application Data

(63) Continuation of application No. PCT/CN2021/103819, filed on Jun. 30, 2021.

(51) Int. Cl.
*H04L 5/00* (2006.01)
*H04W 64/00* (2009.01)

(52) U.S. Cl.
CPC .......... *H04L 5/0051* (2013.01); *H04W 64/00* (2013.01)

(58) Field of Classification Search
CPC ....... H04L 5/00; H04L 5/0007; H04L 5/0048; H04L 5/0051; H04L 5/0094; H04W 4/02; H04W 4/40; H04W 64/00; H04W 92/18
See application file for complete search history.

(56) References Cited

U.S. PATENT DOCUMENTS

| | | | | |
|---|---|---|---|---|
| 10,551,477 | B2 | 2/2020 | Kumar | |
| 11,689,951 | B2 * | 6/2023 | Bao | H04L 5/0053 370/329 |
| 12,101,686 | B2 * | 9/2024 | Xiao | H04W 4/025 |
| 12,225,397 | B2 * | 2/2025 | Shin | H04W 4/46 |
| 12,273,294 | B2 * | 4/2025 | Baek | H04L 5/0033 |
| 12,309,094 | B2 * | 5/2025 | Ren | H04L 5/0094 |
| 12,414,071 | B2 * | 9/2025 | Manolakos | H04W 64/00 |
| 12,542,639 | B2 * | 2/2026 | Keating | H04L 5/0051 |
| 2019/0302220 | A1 | 10/2019 | Kumar | |
| 2020/0154240 | A1 * | 5/2020 | Edge | H04W 4/029 |
| 2020/0374850 | A1 | 11/2020 | Khoryaev et al. | |

(Continued)

FOREIGN PATENT DOCUMENTS

| | | |
|---|---|---|
| CN | 204442708 U | 7/2015 |
| CN | 111919132 A | 11/2020 |

(Continued)

OTHER PUBLICATIONS

Supplementary European Search Report in the European application No. 21947602.5, mailed on May 29, 2024, 9 pages.

(Continued)

*Primary Examiner* — Eric Nowlin
(74) *Attorney, Agent, or Firm* — BAYES PLLC

(57) ABSTRACT

Methods and apparatus for configuring a reference signal are provided. The method includes that: a first terminal receives first information, the first information including configuration information of a first reference signal, and the first reference signal being a reference signal for sidelink positioning.

20 Claims, 6 Drawing Sheets

(56) References Cited

U.S. PATENT DOCUMENTS

| | | | | |
|---|---|---|---|---|
| 2021/0168852 | A1 | 6/2021 | Panteleev | |
| 2021/0185632 | A1* | 6/2021 | Manolakos | H04W 64/003 |
| 2022/0039057 | A1* | 2/2022 | Bao | H04L 5/005 |
| 2022/0173863 | A1* | 6/2022 | Han | H04W 4/46 |
| 2022/0201774 | A1* | 6/2022 | Bao | H04L 5/0051 |
| 2022/0229146 | A1* | 7/2022 | Ko | G01S 5/02216 |
| 2022/0240118 | A1* | 7/2022 | Bao | H04L 5/005 |
| 2022/0272592 | A1* | 8/2022 | Choi | H04W 36/0009 |
| 2022/0279310 | A1* | 9/2022 | Xiao | H04W 4/023 |
| 2022/0321294 | A1 | 10/2022 | Ren et al. | |
| 2022/0416976 | A1* | 12/2022 | Baek | H04L 5/0051 |
| 2023/0050447 | A1* | 2/2023 | Ren | H04L 5/0094 |
| 2023/0065668 | A1* | 3/2023 | Manolakos | G01S 5/0036 |
| 2023/0076043 | A1* | 3/2023 | Manolakos | H04W 64/00 |
| 2023/0097008 | A1* | 3/2023 | Manolakos | H04W 76/15 455/456.1 |
| 2023/0108914 | A1* | 4/2023 | Manolakos | H04W 24/10 370/329 |
| 2023/0125710 | A1* | 4/2023 | Gulati | G01S 5/02 455/456.1 |
| 2023/0209494 | A1* | 6/2023 | Dai | H04W 64/00 455/456.6 |
| 2023/0251342 | A1* | 8/2023 | Zhu | H04W 60/00 455/456.1 |
| 2023/0299917 | A1* | 9/2023 | Ren | H04W 72/11 |
| 2024/0022375 | A1* | 1/2024 | Keating | H04L 5/0051 |
| 2024/0276430 | A1* | 8/2024 | Yilmaz | G01S 5/0236 |
| 2024/0306164 | A1* | 9/2024 | Guo | H04W 64/00 |

FOREIGN PATENT DOCUMENTS

| | | | | |
|---|---|---|---|---|
| CN | 111989585 | A | 11/2020 | |
| CN | 112583553 | A | 3/2021 | |
| CN | 112788519 | A | 5/2021 | |
| CN | 113055136 | A | 6/2021 | |
| EP | 4037226 | A1 | 8/2022 | |
| EP | 4072195 | A1 * | 10/2022 | H04L 5/0051 |
| EP | 4084506 | A1 * | 11/2022 | H04L 5/0094 |
| KR | 20230022853 | A * | 2/2023 | H04W 64/00 |
| WO | 2020154289 | A1 | 7/2020 | |
| WO | 2020246842 | A1 | 12/2020 | |
| WO | WO-2021225696 | A1 * | 11/2021 | H04W 64/006 |
| WO | WO-2021252377 | A1 * | 12/2021 | H04W 64/00 |
| WO | 2022016335 | A1 | 1/2022 | |

OTHER PUBLICATIONS

International Search Report in the international application No. PCT/CN2021/103819, mailed on Apr. 2, 2022, 7 pages with English translation.

English translation of the Written Opinion of the International Search Authority in the international application No. PCT/CN2021/103819, mailed on Apr. 2, 2022, 6 pages with English translation.

LG Electronics, FirstNet, “New SID: Study on scenarios and requirements of in-coverage, partial coverage, and out-of-coverage positioning use cases”clean, 3GPP TSG RAN Meeting #88e RP-201384, Electronic Meeting, Jun. 29-Jul. 3, 2020, 4 pages.

LG Electronics, FirstNet, “New SID: Study on scenarios and requirements of in-coverage, partial coverage, and out-of-coverage positioning use cases”, revision, 3GPP TSG RAN Meeting #88e RP-201384, Electronic Meeting, Jun. 29-Jul. 3, 2020, 4 pages.

First Office Action of the European application No. 21947602.5, issued on Jun. 16, 2026.

* cited by examiner

METHODS AND APPARATUS FOR CONFIGURING A REFERENCE SIGNAL

CROSS-REFERENCE TO RELATED APPLICATION

This application is a continuation of International Patent Application No. PCT/CN2021/103819, filed on Jun. 30, 2021, the disclosure of which is hereby incorporated by reference in its entirety.

BACKGROUND

A positioning service is one of indispensable services in daily life. A positioning technology based on a radio technology has been widely used.

In the related art, multiple Positioning Reference Signals (PRSs) are transmitted through multiple base stations in a mobile communication system. A terminal may locate its own position based on the multiple PRSs transmitted by the multiple base stations.

SUMMARY

The present disclosure relates to the field of mobile communications, and in particular to methods and apparatus for configuring a reference signal, which can configure a reference signal for SL positioning and provide a positioning technology in a communication scenario of the SL. The technical solution is implemented as follows.

In an aspect of the present disclosure, a method for configuring a reference signal is provided. The method includes the following operation.

A first terminal receives first information including configuration information of a first reference signal.

The first reference signal is a reference signal for SL positioning.

In an aspect of the present disclosure, another method for configuring a reference signal is provided. The method includes the following operation.

A first communication device transmits first information including configuration information of a first reference signal.

The first reference signal is a reference signal for SL positioning.

In an aspect of the present disclosure, an apparatus for configuring a reference signal is provided. The apparatus includes a processor, a transceiver and memory configured to store a computer program executable by the processor.

The processor is configured to execute the computer program to control the transceiver to receive first information including configuration information of a first reference signal.

The first reference signal is a reference signal for SL positioning.

BRIEF DESCRIPTION OF THE DRAWINGS

In order to more clearly explain the technical solutions in the embodiments of the present disclosure, the drawings to be used in the description of the embodiments will be briefly introduced below. It is apparent that the drawings described below are only some embodiments of the present disclosure, and other drawings can be obtained from these drawings without creative effort for those of ordinary skill in the art.

DETAILED DESCRIPTION

In order to make the object, technical solutions and advantages of the present disclosure clearer, the embodiments of the present disclosure will be described in further detail below with reference to the accompanying drawings.

The network architecture and service scenario described in the embodiments of the present disclosure are intended to more clearly explain the technical solutions of the embodiments of the present disclosure, and do not constitute a limitation to the technical solutions provided by the embodiments of the present disclosure. Those of ordinary skill in the art will appreciate that, with an evolution of the network architecture and an emergence of new service scenarios, the technical solutions provided by the embodiments of the present disclosure are applicable to similar technical problems.

Figure 1:
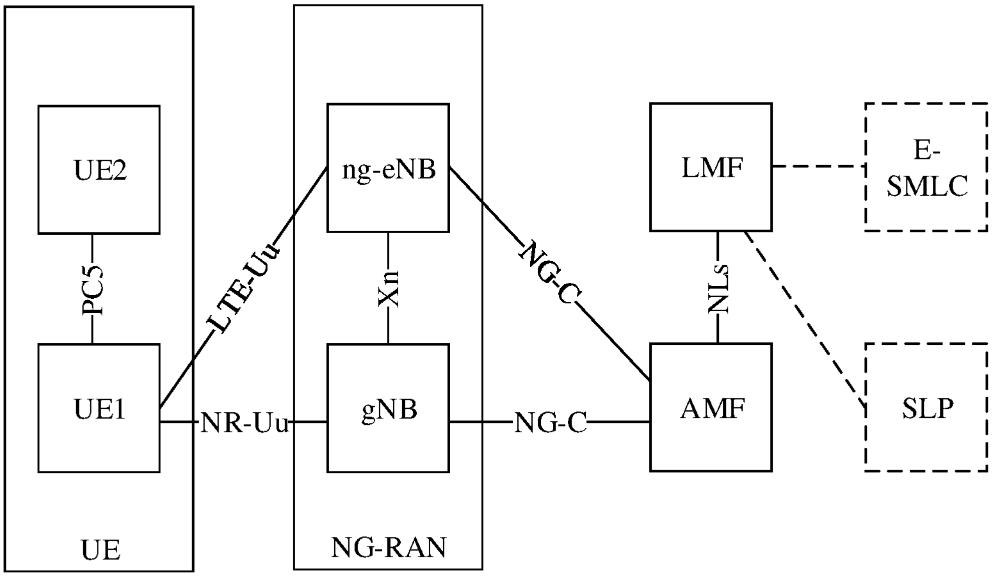
FIG. 1 is an architectural schematic diagram of a communication system provided by an exemplary embodiment of the present disclosure.

FIG. 1 illustrates an architectural schematic diagram of a communication system provided by an exemplary embodiment of the present disclosure. As illustrated in FIG. 1, the communication system may include: User Equipment (UE), Next Generation-Radio Access Networks (NG-RANs), a Location Management Function (LMF), an Access and Mobility Management Function (AMF), an Enhanced-Service Mobile Location Center (E-SMLC), and an Service Location Protocol (SLP).

The UE is an entrance for a mobile user to interact with the network, which can provide basic computing ability and storage ability, display a service window to the user and receive an operation input from the user. The UE adopts the next generation air interface technology to establish signal connection and data connection with the NG-RAN, so as to transmit control signals and service data to the mobile network. A link and communication on the SL can be realized between different UEs through a Proximity Communication (PC5) interface. For example, UE1 communicates with UE2 through the SL based on the PC5 interface.

The NG-RAN includes an upgraded 4G base station (next generation-evolved Node B (ng-eNB)) and a 5G base station (next generation-NodeB (gNB)). In the related art, the ng-eNB is a network entity in the NG-RAN, which can provide measurements for location estimation, measure a radio signal for the target UE, and transmit the measurements to the LMF. The ng-eNB performs measurements in response to a request from the LMF (on demand or periodically). The ng-eNB may serve multiple transmission points (TPs), which may include, for example, a remote radio head and a Positioning Reference Signal (PRS)-based terrestrial beacon system (TBS) positioning in which only the PRS is used for the Evolving-Universal Terrestrial Radio Access (E-UTRA). The gNB is a network entity in the NG-RAN, which can provide measurement information for the target UE and transmit the information to the LMF. It should be noted that gNB and ng-eNB may not always both be present. When both the gNB and ng-eNB are present, only one of the NG-C interfaces is present. The UE is connected to the gNB via a New Radio-User equipment (NR-Uu) interface. The NR-Uu interface is one of several transmission links with the LTE positioning protocol for the target UE with NR access to the NG-RAN. The UE is connected to the ng-eNB through a Long Term Evolution-User Equipment (LTE-Uu) interface. The LTE-Uu interface is one of several transmission links with the LTE positioning protocol.

The LMF is used for managing supports for different location services for a target UE, which include positioning of the UE and delivery of auxiliary data to the UE. The LMF may interact with the serving gNB or the serving ng-eNB for the target UE, so as to obtain location measurements of the UE, which include an uplink measurement performed by the ng-eNB and a downlink measurement provided by the UE to the ng-eNB. eN is used as a part of other functionality, for example, to support handover. The LMF may interact with the target UE to transmit the auxiliary data when requesting a specific location service, or to obtain a location estimate if requested.

The AMF is used for receiving, from another entity, a request for some location services associated with a particular target UE, or the AMF itself decides to initiate some location services on behalf of the particular target UE (e.g., an IP Multimedia Subsystem (IMS) emergency call from the particular target UE). The AMF then transmits a location service request to the LMF. The LMF processes the location service request, including transmitting the auxiliary data to the target UE to assist UE-based and/or UE-assisted positioning and/or including positioning of the target UE. Then, when the LMF returns the result of the location service to the AMF requesting the location service, the AMF returns the result of the location service to the entity.

The E-SMLC is used for locating the UE.

The SLP is a Secure User Plane (SUPL) entity responsible for positioning on the user plane.

In a communication scenario based on SideLink (SL), there is not necessarily a base station, and how to position based on the SL is an urgent technical problem to be studied.

In the communication scenario based on the SL, it is desirable to provide a positioning technology that does not rely on or heavily rely on gNB, so that the positioning service is implemented between UE1 and UE2, or among multiple UEs.

Figure 2:
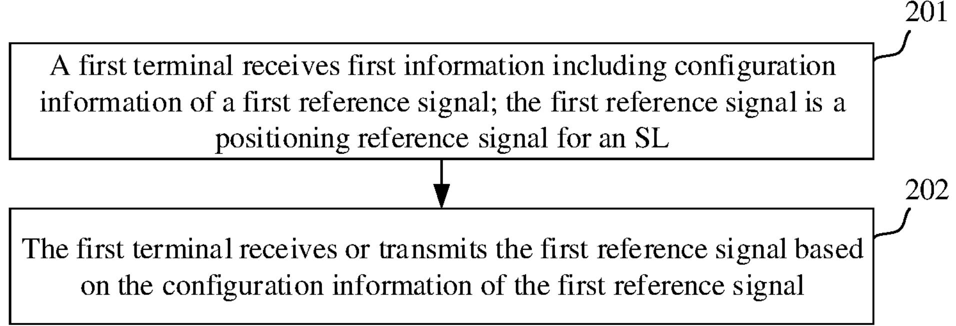
FIG. 2 is a flowchart of a method for configuring a reference signal provided by an exemplary embodiment of the present disclosure.

FIG. 2 illustrates a flowchart of a method for configuring a reference signal provided by an exemplary embodiment of the present disclosure. In order to implement configuration of a reference signal for the SL, the method is performed by a first terminal, and the method includes the following operations.

In operation 201, the first terminal receives first information including configuration information of a first reference signal. The first reference signal is a reference signal for SL positioning.

The first information is the configuration information for configuring the first reference signal, and the first reference signal is a positioning reference signal or a location reference signal for the SL. In other words, the first reference signal is a reference signal for positioning a target terminal in the SL scenario. The first reference signal is used for determining at least one of: location information of the target terminal or distance information of the target terminal. The location information includes an absolute location or a relative location.

Exemplarily, the first reference signal includes at least one of: a SideLink-Position Reference Signal (SL-PRS), a Channel State Information-Reference Signal (CSI-RS), a Demodulation Reference Signal (DMRS), a Phase Tracking Reference Signal (PTRS), or a System Synchronization Block (SSB).

For example, the first reference signal is the PRS, and the first information includes at least one of:

- start time of transmission of the first reference signal (Start time of PRS transmission);
- end time of the transmission of the first reference signal (End time of PRS transmission);
- a resource bandwidth of the first reference signal (PRS resource bandwidth);
- a resource set identifier (ID) of the first reference signal (PRS resource set ID);
- a resource ID of the first reference signal (PRS resource ID);
- a transmission periodicity and offset of the first reference signal (PRS transmission periodicity and offset);
- a resource repetition factor of the first reference signal (PRS resource repetition factor);
- a number of symbols for the first reference signal per resource for the first reference signal (Number of PRS symbols per PRS resource);
- a muting pattern of the first reference signal (PRS muting pattern);
- a number of receiving or transmitting terminals of the first reference signal (Number of TX UEs);
- information about receiving or transmitting terminals of the first reference signal (TX UE info);
- a type of the first reference signal (PRS type);
- a number of resources for the first reference signal per resource set for the first reference signal (Number of PRS resources per PRS resource set);
- a number of frequency layers or a frequency layer indicator (Number frequency layers or frequency layer indicator);
- beam directions;
- a comb size, a start physical resource block (PRB) and a point A of the first reference signal (Comb size, start PRB, Point A of PRS);
- an on or off indicator of the first reference signal (ON/OFF indicator of the PRS); or a measurement gap of the first reference signal (Measurement gap).

For example, the information about the receiving terminal is an identifier of the target terminal (which may be a UE ID, such as a layer 2 ID, or a destination ID).

The information about the transmitting terminal is an identifier of a terminal transmitting the reference signal (which may be a UE ID, such as a layer 2 ID, or a destination ID).

Optionally, the type of the first reference signal includes at least one of: a periodic signal, an aperiodic signal, or a semi-persistent signal.

Optionally, the measurement gap of the first reference signal is transmitted by a first communication device.

Optionally, the measurement gap of the first reference signal is configured by the first communication device upon receiving a request from the first terminal.

Optionally, the measurement gap of the first reference signal is a gap for receiving/transmitting in an inter-frequency scenario.

Optionally, the measurement gap of the first reference signal is configured within the first information and transmitted by the first communication device to the first terminal.

Optionally, the measurement gap of the first reference signal is transmitted by the first communication device to the first terminal through other messages (distinguished from the first information).

Optionally, the configuration of the first reference signal is bound to the transmitting/receiving terminal, or the configuration granularity of the first reference signal is per transmitting/receiving terminal.

In operation 202, the first terminal receives or transmits the first reference signal based on the configuration information of the first reference signal.

The first reference signal is used for determining at least one of location information of a target terminal or distance information of the target terminal.

When the first terminal is a transmitting terminal, the first terminal determines a configuration for transmitting the first reference signal based on the configuration information of the first reference signal, and transmits the first reference signal based on the transmitting configuration.

When the first terminal is a receiving terminal, the first terminal determines a configuration for receiving the first reference signal based on the configuration information of the first reference signal, and receives the first reference signal based on the receiving configuration.

To sum up, the first terminal configures the first reference signal for SL positioning by receiving the first information. After obtaining the configuration information of the first reference signal, the first terminal can transmit or receive the first reference signal based on the configuration in the communication scenario based on the SL, thereby implementing the positioning technology in the communication scenario based on the SL.

Figure 3:
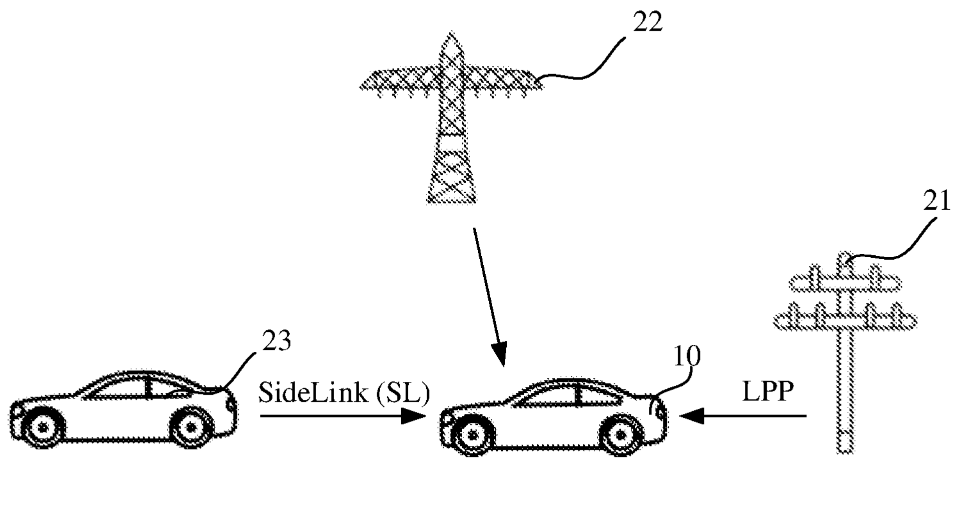
FIG. 3 is a schematic diagram of a network architecture provided by an exemplary embodiment of the present disclosure.

In some embodiments, uplink configuration information may be transmitted by the first communication device and the first terminal 10 receives the first information transmitted by the first communication device. With reference to FIG. 3, the first communication device includes at least one of an LMF 21, a first access network device 22 or a second terminal 23.

When the first information is transmitted by the LMF 21, the first information is transmitted through an LTE Positioning Protocol (LPP).

When the first information is transmitted by the first access network device 22, the first information is carried in at least one of: a Radio Resource Control (RRC) message, a Media Access Control Control Element (MAC CE), Downlink Control Information (DCI), or pre-configuration information.

The pre-configuration information may be at least one of first information stored in a Subscriber Identity Module (SIM) card of the first terminal 10 or first information received by the first terminal.

Optionally, the first access network device 22 includes at least one of a base station or a Road Side Unit (RSU).

When the first information is transmitted by the second terminal 23, the first information is carried in at least one of: a PC5-Signalling (PC5-S) message, a PC5-RRC message, a MAC CE, or Sidelink Control Information (SCI).

Optionally, the second terminal 23 includes at least one of a terminal device or an RSU.

Figure 4:
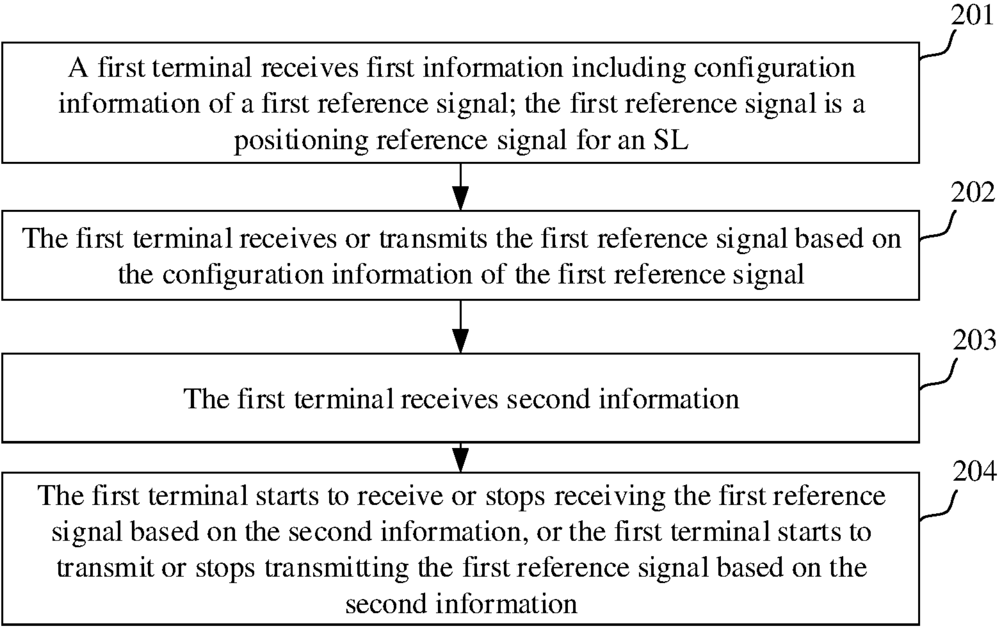
FIG. 4 is a flowchart of a method for configuring a reference signal provided by an exemplary embodiment of the present disclosure.

In some embodiments, FIG. 4 illustrates a flowchart of a method for configuring a reference signal provided by an exemplary embodiment of the present disclosure. Based on the embodiment illustrated in FIG. 2, the method for configuring the reference signal further includes the following operations.

In operation 203, the first terminal receives second information.

The second information is used for activating or deactivating the first reference signal. The transmitting end of the second information is the same as the transmitting end of the first information, or the transmitting end of the second information is different from the transmitting end of the first information. Optionally, the second information may include a terminal identifier, and the terminal identifier may be an identifier of a receiving/transmitting terminal of the first reference signal, which may be a UE ID, such as a layer 2 ID, or a destination ID. Optionally, the second information may include a type of the first reference signal, which may include at least one of a periodic signal, an aperiodic signal, or a semi-persistent signal.

Optionally, the second information includes beam information associated with the first reference signal, and the beam information includes at least one of: a Demodulation Reference Signal (DMRS), a Phase Tracking Reference Signal (PTRS), a System Synchronization Block (SSB), a Channel State Information-Reference Signal (CSI-RS), or a Positioning Reference Signal (PRS).

Exemplarily, the first terminal receives the second information by at least the following two ways.

In the first way, the first terminal receives the second information transmitted by the first communication device.

With reference to FIG. 3, the first terminal 10 receives the second information transmitted by the first communication device. The first communication device is the second terminal 23 or the first access network device 22.

Optionally, the first terminal 10 receives the second information transmitted by the second terminal 23. When the second information is transmitted by the second terminal 23, the second information is carried in at least one of: an RRC message, a MAC CE, or SCI.

Optionally, the first terminal 10 receives the second information transmitted by the first access network device 22. When the second information is transmitted by the first access network device, the second information is carried in at least one of: an RRC message, a system message, a MAC CE, or DCI.

In the second way, the first terminal receives the second information transmitted by a second communication device.

Figure 5:
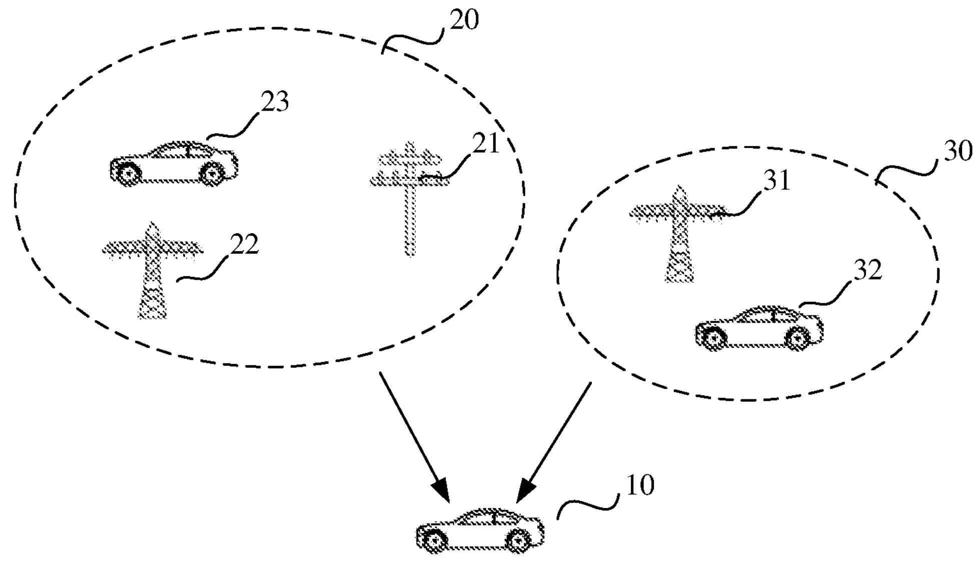
FIG. 5 is a schematic diagram of a network architecture provided by an exemplary embodiment of the present disclosure.

With reference to FIG. 5, it is assumed that the transmitting end of the first information is the first communication device 20 and the transmitting end of the second information is the second communication device 30. The first terminal 10 receives the second information transmitted by the second communication device 30. Exemplarily, the second communication device 30 is a third terminal 32 or a second access network device 31.

Optionally, the first terminal 10 receives the second information transmitted by the third terminal 32.

When the second information is transmitted by the third terminal, the second information is carried in at least one of: an RRC message, a MAC CE, or SCI.

Optionally, the first terminal 10 receives the second information transmitted by the second access network device 31.

When the second information is transmitted by the second access network device, the second information is carried in at least one of: an RRC message, a system message, a MAC CE, or DCI.

It should be noted that the third terminal is the same as or different from the second terminal, and the second terminal is a terminal for transmitting the first information. The second access network device is the same as or different from the first access network device, and the first access network device is an access network device for transmitting the first information.

The transmitting ends of the first information and the second information are not limited in the present disclosure. For example, the first information is transmitted by the second terminal, and the second information is transmitted by the first access network device. Optionally, the first information is transmitted by the third terminal, and the second information is transmitted by the second access network device, and other transmitting methods are possible.

In operation 204, the first terminal starts to receive or stops receiving the first reference signal based on the second information, or, the first terminal starts to transmit or stops transmitting the first reference signal based on the second information.

When the second information is used for activating the first reference signal and the first terminal is a transmitting terminal, the first terminal starts to transmit the first reference signal based on the second information.

When the second information is used for activating the first reference signal and the first terminal is a receiving terminal, the first terminal starts to receive the first reference signal based on the second information.

When the second information is used for deactivating the first reference signal and the first terminal is a transmitting terminal, the first terminal stops transmitting the first reference signal based on the second information.

When the second information is used for deactivating the first reference signal and the first terminal is a receiving terminal, the first terminal stops receiving the first reference signal based on the second information.

To sum up, in the method provided by the embodiment, the first reference signal is activated or deactivated through the second information, and a dynamic "on/off" function is provided for the transmission process of the first reference signal, which effectively saves the communication resources of the SL. The use of the first reference signal is started dynamically in a scenario where positioning is required, and the use of the first reference signal is stopped dynamically in a scenario where positioning is not required.

Figure 6:
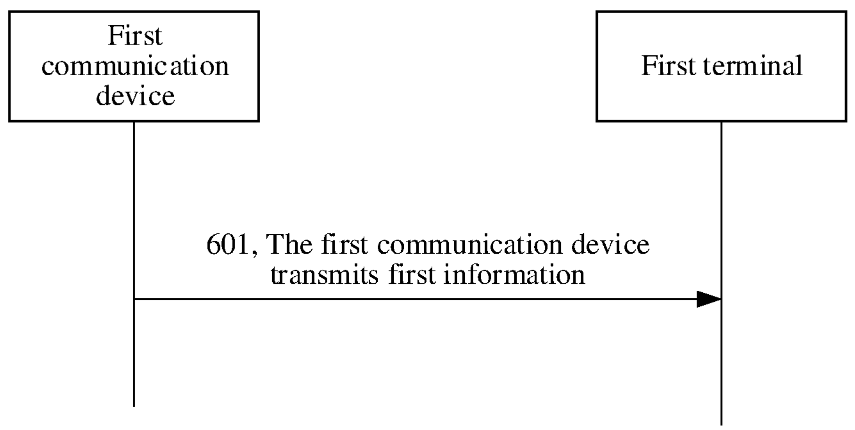
FIG. 6 is a flowchart of a method for configuring a reference signal provided by an exemplary embodiment of the present disclosure.

In an embodiment, FIG. 6 illustrates a flowchart of a method for configuring a reference signal provided by an exemplary embodiment of the present disclosure. In order to implement configuration of a reference signal for the SL, the method for configuring the reference signal includes the following operation.

In operation 601, the first communication device transmits first information including configuration information of a first reference signal.

The first information is configuration information for configuring the first reference signal, and the first reference signal is a positioning reference signal or a location reference signal for the SL. In other words, the first reference signal is a reference signal for positioning a target terminal in the SL scenario. The first reference signal is used for determining at least one of: location information of the target terminal or distance information of the target terminal. The location information includes an absolute location or a relative location.

Exemplarily, the first reference signal includes at least one of: an SL-PRS, a CSI-RS, a DMRS, a PTRS, or an SSB.

For example, the first reference signal is the PRS, and the first information includes at least one of:

- start time of transmission of the first reference signal;
- end time of the transmission of the first reference signal;
- a resource bandwidth of the first reference signal;
- a resource set ID of the first reference signal;
- a resource ID of the first reference signal;
- a transmission periodicity and offset of the first reference signal;
- a resource repetition factor of the first reference signal;
- a number of symbols for the first reference signal per resource for the first reference signal;
- a muting pattern of the first reference signal;
- a number of receiving or transmitting terminals of the first reference signal;
- information about receiving or transmitting terminals of the first reference signal;
- a type of the first reference signal;
- a number of resources for the first reference signal per resource set for the first reference signal;
- a number of frequency layers or a frequency layer indicator;
- beam directions;
- a comb size, a start physical resource block (PRB) and a point A of the first reference signal;
- an on or off indicator of the first reference signal; or
- a measurement gap of the first reference signal.

For example, the information about the receiving terminal is an identifier of the target terminal (which may be a UE ID, such as a layer 2 ID, or a destination ID).

The information about the transmitting terminal is an identifier of a terminal transmitting the reference signal (which may be a UE ID, such as a layer 2 ID, or a destination ID).

Optionally, the type of the first reference signal includes at least one of a periodic signal, an aperiodic signal, or a semi-persistent signal.

Optionally, the measurement gap of the first reference signal is transmitted by the first communication device.

Optionally, the measurement gap of the first reference signal is configured by the first communication device upon receiving a request from a first terminal.

Optionally, the measurement gap of the first reference signal is a gap for receiving/transmitting in an inter-frequency scenario.

Optionally, the measurement gap of the first reference signal is configured within the first information and transmitted by the first communication device to the first terminal.

Optionally, the measurement gap of the first reference signal is transmitted to the first terminal through other messages (distinguished from the first information).

Optionally, the configuration of the first reference signal is bound to the transmitting/receiving terminal, or the configuration granularity of the first reference signal is per transmitting/receiving terminal.

The first communication device transmits the first information by at least one of the following three ways.

In the first way, when the first communication device is an LMF, the LMF transmits the first information through an LPP protocol.

In the second way, when the first communication device is a first access network device, the first access network device carries the first information in at least one of: an RRC message, a MAC CE, DCI, or a pre-configuration message and transmits the first information.

Optionally, the first access network device includes at least one of a base station or an RSU.

In the third way, when the first communication device is a second terminal, the second terminal carries the first information in at least one of: a PC5-S message, a PC5-RRC message, a MAC CE, or SCI and transmits the first information.

Optionally, the second terminal includes at least one of a terminal device or an RSU.

Figure 7:
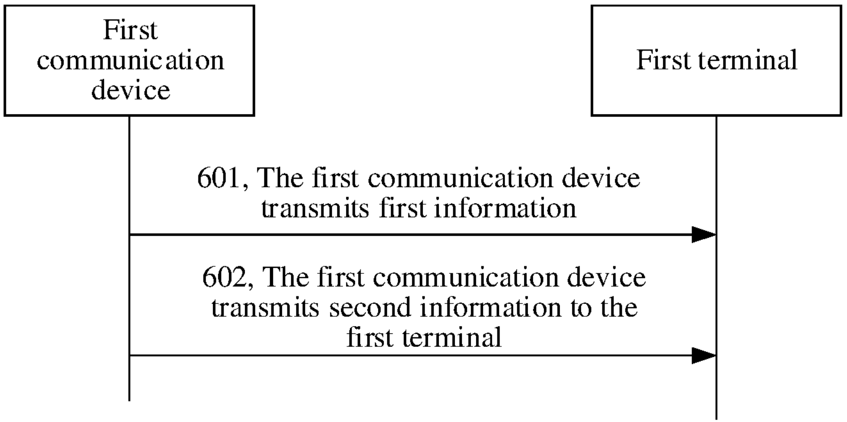
FIG. 7 is a flowchart of a method for configuring a reference signal provided by an exemplary embodiment of the present disclosure.

In an embodiment, FIG. 7 illustrates a flowchart of a method for configuring a reference signal provided by an exemplary embodiment of the present disclosure. Based on the embodiment illustrated in FIG. 6, in order to implement configuration of the reference signal for the SL, the method for configuring the reference signal further includes the following operation.

In operation 602, the first communication device transmits second information to the first terminal.

The second information enables the first terminal to start to receive or stop receiving the first reference signal based on the second information. Alternatively, the second information enables the first terminal to start to transmit or stop transmitting the first reference signal based on the second information.

Optionally, the second information is used for activating or deactivating the first reference signal.

Optionally, the second information may include a terminal identifier, and the terminal identifier may be an identifier of a receiving/transmitting terminal of the first reference signal, which may be a UE ID, such as a layer 2 ID, or a destination ID.

Optionally, the second information includes a type of the first reference signal. The type of the first reference signal includes at least one of a periodic signal, an aperiodic signal, or a semi-persistent signal.

Optionally, the second information includes beam information associated with the first reference signal, and the beam information includes at least one of: a DMRS, a PTRS, an SSB, a CSIRS, or a PRS.

The first communication device may transmit the second information by at least one of the following two ways.

In the first way, when the first communication device is a second terminal, the second information is carried in at least one of a MAC CE or SCI.

In the second way, when the first communication device is a first access network device, the second information is carried in at least one of: an RRC message, a system message, a MAC CE, or DCI.

Figure 8:
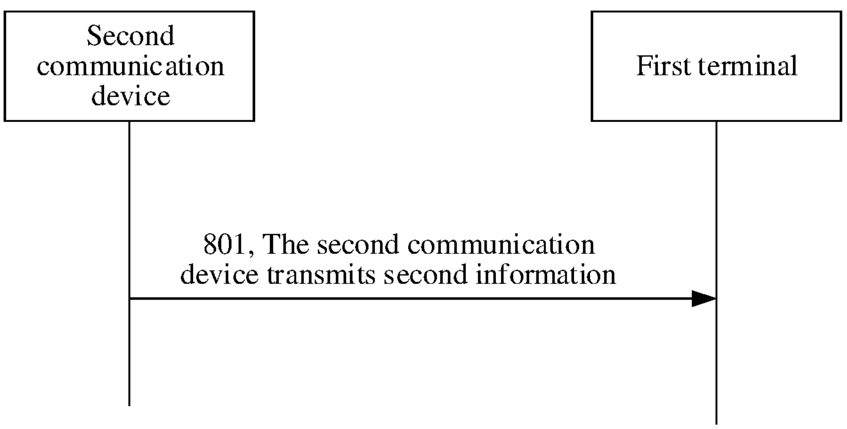
FIG. 8 is a flowchart of a method for configuring a reference signal provided by an exemplary embodiment of the present disclosure.

In an embodiment, FIG. 8 illustrates a flowchart of a method for configuring a reference signal provided by an exemplary embodiment of the present disclosure. In order to implement configuration of a reference signal for an SL, the method for configuring the reference signal includes the following operation.

In operation 801, a second communication device transmits second information. The second information enables a first terminal to start to receive or stop receiving a first reference signal based on the second information, or, the second information enables the first terminal to start to transmit or stop transmitting the first reference signal based on the second information.

The second information is used for activating or deactivating the first reference signal. The first reference signal is used for determining at least one of: location information of a target terminal or distance information of the target terminal. The first reference signal comprises at least one of: a CSI-RS, a DMRS, a PTRS or an SSB.

Optionally, the second information may include a terminal identifier, and the terminal identifier may be an identifier of a receiving/transmitting terminal of the first reference signal, which may be a UE ID, such as a layer 2 ID, or a destination ID.

Optionally, the second information includes a type of the first reference signal, and the type of the first reference signal includes at least one of a periodic signal, an aperiodic signal, or a semi-persistent signal.

Optionally, the second information includes beam information associated with the first reference signal, and the beam information includes at least one of: a DMRS, a PTRS, an SSB, a CSI-RS, or a PRS.

The second communication device may transmit the second information by at least one of the following two ways.

In the first way, when the second communication device is a third terminal, the third terminal transmits the second information.

When the third terminal transmits the second information, the second information is carried in at least one of: an RRC message, a MAC CE, or SCI.

Optionally, the third terminal includes at least one of a terminal device or an RSU.

In the second way, when the second communication device is a second access network device, the second access network device transmits the second information.

When the second access network device transmits the second information, the second information is carried in at least one of: an RRC message, a system message, a MAC CE, or DCI.

Optionally, the second access network device includes at least one of a base station or an RSU.

Figure 9:
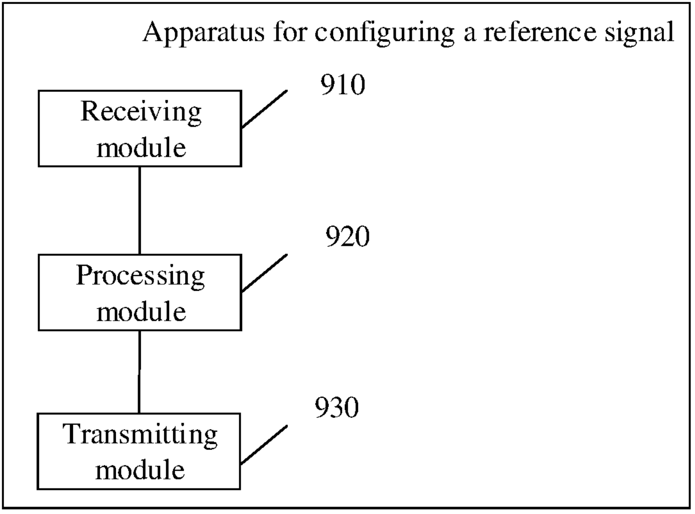
FIG. 9 is a structural schematic diagram of an apparatus for configuring a reference signal provided by an exemplary embodiment of the present disclosure.

FIG. 9 illustrates a structural schematic diagram of an apparatus for configuring a reference signal provided by an exemplary embodiment of the present disclosure. In order to implement configuration of a reference signal for the SL, the apparatus includes a receiving module 910.

The receiving module 910 is configured to receive first information including configuration information of a first reference signal.

The first reference signal is a reference signal for SL positioning.

In an optional embodiment, the configuration information includes at least one of: start time of transmission of the first reference signal; end time of the transmission of the first reference signal; a resource bandwidth of the first reference signal; a resource set ID of the first reference signal; a resource ID of the first reference signal; a transmission periodicity and offset of the first reference signal; a resource repetition factor of the first reference signal; a number of symbols for the first reference signal per resource for the first reference signal; a muting pattern of the first reference signal; a number of receiving/transmitting terminals of the first reference signal; information about receiving or transmitting terminals of the first reference signal; a type of the first reference signal; a number of resources for the first reference signal per resource set for the first reference signal; a number of frequency layers or a frequency layer indicator; beam directions; a comb size, a start PRB and a point A of the first reference signal; an on or off indicator of the first reference signal; or a measurement gap of the first reference signal.

In an optional embodiment, the type of the first reference signal includes at least one of a periodic signal, an aperiodic signal, or a semi-persistent signal.

In an optional embodiment, the measurement gap of the first reference signal is transmitted by a first communication device.

In an optional embodiment, the measurement gap of the first reference signal is configured by the first communication device upon receiving a request from a first terminal.

In an optional embodiment, the measurement gap of the first reference signal is configured within the first information and transmitted by the first communication device to the first terminal.

In an optional embodiment, the measurement gap of the first reference signal is transmitted to the first terminal through other messages (distinguished from the first information).

In an optional embodiment, the apparatus for configuring the reference signal further includes a processing module 920.

The processing module 920 is configured to receive or transmit the first reference signal based on the configuration information of the first reference signal.

In an optional embodiment, the receiving module 910 is further configured to receive the first information transmitted by an LMF.

In an optional embodiment, the receiving module 910 is further configured to receive the first information transmitted by a first access network device.

In an optional embodiment, the receiving module 910 is further configured to receive the first information transmitted by a second terminal.

In an optional embodiment, when the first information is transmitted by the LMF, the first information is transmitted through an LPP.

In an optional embodiment, when the first information is transmitted by the first access network device, the first information is carried in at least one of: an RRC message, a MAC CE, DCI, or pre-configuration information.

In an optional embodiment, when the first information is transmitted by the second terminal, the first information is carried in at least one of: a PC5-S message, a PC5-RRC massage, a MAC CE, or SCI.

In an optional embodiment, the receiving module 910 is further configured to receive second information.

In an optional embodiment, the receiving module 910 is further configured to start to receive or stop receiving the first reference signal based on the second information.

In an optional embodiment, the apparatus for configuring the reference signal further includes a transmitting module 930.

In an optional embodiment, the transmission module 930 is further configured to start to transmit or stop transmitting the first reference signal based on the second information.

In an optional embodiment, the second information is used for activating or deactivating the first reference signal.

In an optional embodiment, the receiving module 910 is further configured to receive the second information transmitted by a third terminal.

In an optional embodiment, the receiving module 910 is further configured to receive the second information transmitted by a second access network device.

In an optional embodiment, when the second information is transmitted by the third terminal, the second information is carried in at least one of: an RRC message, a MAC CE, or SCI.

In an optional embodiment, when the second information is transmitted by the second access network device, the second information is carried in at least one of: an RRC message, a system message, a MAC CE, or DCI.

In an optional embodiment, the third terminal is the same as or different from a second terminal, and the second terminal is a terminal that transmits the first information.

In an optional embodiment, the second access network device is the same as or different from a first access network device, and the first access network device is an access network device that transmits the first information.

In an optional embodiment, the second information includes a terminal identifier, and the terminal identifier may be an identifier of a receiving/transmitting terminal of the first reference signal, which may be a UE ID, such as a Layer 2 ID, or a destination ID.

In an optional embodiment, the second information includes a type of the first reference signal.

In an optional embodiment, the second information includes beam information associated with the first reference signal, and the beam information includes at least one of: a DMRS, a PTRS, an SSB, a CSI-RS, or a PRS.

In an optional embodiment, the first reference signal is used for determining at least one of: location information of a target terminal or distance information of the target terminal.

In an optional embodiment, the first reference signal includes at least one of: a CSI-RS, a DMRS, a PTRS, or an SSB.

In an optional embodiment, the configuration of the first reference signal is bound to the transmitting/receiving terminal, or the configuration granularity of the first reference signal is per transmitting/receiving terminal.

Figure 10:
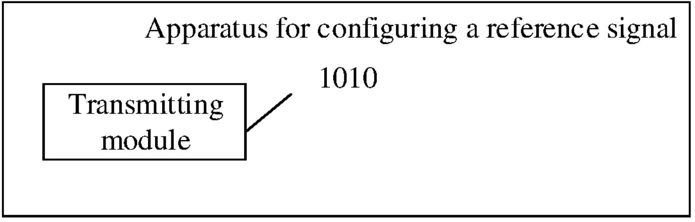
FIG. 10 is a structural schematic diagram of an apparatus for configuring a reference signal provided by an exemplary embodiment of the present disclosure.

FIG. 10 is a structural schematic diagram of an apparatus for configuring a reference signal provided by an exemplary embodiment of the present disclosure. The apparatus for configuring a reference signal includes a transmitting module 1010.

The transmitting module 1010 is configured to transmit first information including configuration information of a first reference signal.

The first reference signal is a reference signal for SL positioning.

In an optional embodiment, the configuration information includes at least one of: start time of transmission of the first reference signal; end time of the transmission of the first reference signal; a resource bandwidth of the first reference signal; a resource set ID of the first reference signal; a resource ID of the first reference signal; a transmission periodicity and offset of the first reference signal; a resource repetition factor of the first reference signal; a number of symbols for the first reference signal per resource for the first reference signal; a muting pattern of the first reference signal; a number of receiving/transmitting terminals of the first reference signal; information about receiving or transmitting terminals of the first reference signal; a type of the first reference signal; a number of resources for the first reference signal per resource set for the first reference signal; a number of frequency layers or a frequency layer indicator; beam directions; a comb size, a start PRB and a point A of the first reference signal; an on or off indicator of the first reference signal; or a measurement gap of the first reference signal.

In an optional embodiment, the type of the first reference signal includes at least one of a periodic signal, an aperiodic signal, or a semi-persistent signal.

In an optional embodiment, the measurement gap of the first reference signal is transmitted by a first communication device.

In an optional embodiment, the measurement gap of the first reference signal is configured by the first communication device upon receiving a request from a first terminal.

In an optional embodiment, the measurement gap of the first reference signal is configured within the first information and transmitted by the first communication device to the first terminal.

In an optional embodiment, the measurement gap of the first reference signal is transmitted to the first terminal through other messages (distinguished from the first information).

In an optional embodiment, when the first communication device is an LMF, the transmitting module 1010 is further configured to transmit the first information.

In an optional embodiment, when the first communication device is a first access network device, the transmitting module 1010 is further configured to transmit the first information.

In an optional embodiment, the transmitting module 1010 is further configured to transmit the first information through an LPP.

In an optional embodiment, the transmitting module 1010 is further configured to carry the first information in at least one of: an RRC message, a MAC CE, DCI, or pre-configuration information.

In an optional embodiment, the sending module 1010 is further configured to carry the first information in at least one of: a PC5-S message, a PC5-RRC message, a MAC CE, or SCI.

In an optional embodiment, the transmitting module 1010 is further configured to transmit the second information. The second information enables the first terminal to start to receive or stop receiving the first reference signal based on the second information, or, the second information enables the first terminal to start to transmit or stop transmitting the first reference signal based on the second information.

In an optional embodiment, the second information is used for activating or deactivating the first reference signal.

In an optional embodiment, the transmitting module 1010 is further configured to carry the second information in at least one of: an RRC message, a MAC CE, or SCI.

In an optional embodiment, the transmitting module 1010 is further configured to carry the second information in at least one of: an RRC message, a system message, a MAC CE, or DCI.

In an optional embodiment, the second information includes a terminal identifier, and the terminal identifier may be an identifier of a receiving/transmitting terminal of the first reference signal, which may be a UE ID, such as a Layer 2 ID, or a destination ID.

In an optional embodiment, the second information includes a type of the first reference signal.

In an optional embodiment, the second information includes beam information associated with the first reference signal, and the beam information includes at least one of: a DMRS, a PTRS, an SSB, a CSIRS, or a PRS.

In an optional embodiment, the first reference signal is used for determining at least one of: location information of a target terminal or distance information of the target terminal.

In an optional embodiment, the first reference signal includes at least one of: a CSI-RS, a DMRS, a PTRS, or an SSB.

In an optional embodiment, the configuration of the first reference signal is bound to the transmitting/receiving terminal, or the configuration granularity of the first reference signal is per transmitting/receiving terminal.

Figure 11:
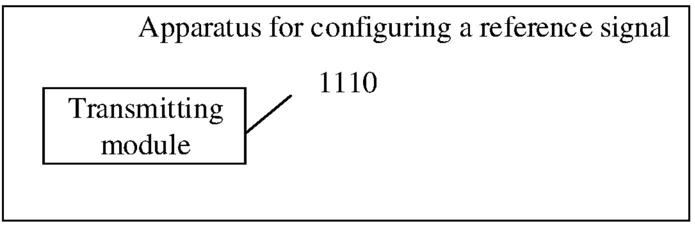
FIG. 11 is a structural schematic diagram of an apparatus for configuring a reference signal provided by an exemplary embodiment of the present disclosure.

FIG. 11 illustrates a structural schematic diagram of an apparatus for configuring a reference signal provided by an exemplary embodiment of the present disclosure. The apparatus for configuring the reference signal includes a transmitting module 1110.

The transmitting module 1110 is configured to transmit second information. The second information enables the first terminal to start to receive or stop receiving a first reference signal based on the second information, or, the second information enables the first terminal to start to transmit or stop transmitting the first reference signal based on the second information.

In an optional embodiment, the second information is used for activating or deactivating the first reference signal.

In an optional embodiment, the transmitting module 1110 is further configured to carry the second information in at least one of: an RRC message, a MAC CE, or SCI.

In an optional embodiment, the transmitting module 1110 is further configured to carry the second information in at least one of: an RRC message, a system message, a MAC CE, or DCI.

In an optional embodiment, the second information includes a terminal identifier, and the terminal identifier may be an identifier of a receiving/transmitting terminal of the first reference signal, which may be a UE ID, such as a Layer 2 ID, or a destination ID.

In an optional embodiment, the second information includes a type of the first reference signal.

In an optional embodiment, the second information includes beam information associated with the first reference signal, and the beam information includes at least one of: a DMRS, a PTRS, an SSB, a CSIRS, or a PRS.

In an optional embodiment, the first reference signal is used for determining at least one of: location information of the target terminal or distance information of the target terminal.

In an optional embodiment, the first reference signal includes at least one of: a CSI-RS, a DMRS, a PTRS, or an SSB.

In an optional embodiment, the configuration of the first reference signal is bound to the transmitting/receiving terminal, or the configuration granularity of the first reference signal is per transmitting/receiving terminal.

Figure 12:
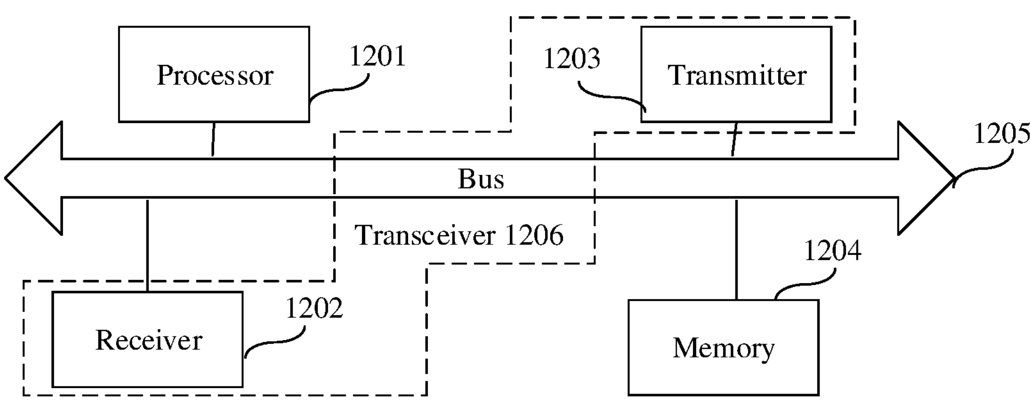
FIG. 12 is a structural schematic diagram of a communication device provided by an exemplary embodiment of the present disclosure.

FIG. 12 illustrates a structural schematic diagram of a communication device provided by an exemplary embodiment of the present disclosure. For example, the communication device may be used for performing the methods for configuring the reference signal described above. Specifically, the communication device 1200 may include: a processor 1201, a receiver 1202, a transmitter 1203, a memory 1204 and a bus 1205.

The processor 1201 includes one or more processing cores and executes various functional applications and information processing by running software programs and modules.

The receiver 1202 and transmitter 1203 may be implemented as a transceiver 1206, which may be a communication chip.

The memory 1204 is connected to the processor 1201 through the bus 1205.

The memory 1204 may be configured to store a computer program, and the processor 1201 may be configured to execute the computer program to implement various operations performed by the terminal, access network entity, core network element or core network entity in the above method embodiments.

The transmitter 1203 is configured to perform the operations related to transmission in the above various method embodiments. The receiver 1202 is configured to perform the operations related to reception in the above various method embodiments. The processor 1201 is configured to perform the operations other than the transmitting and receiving operations in the above various embodiments.

In addition, the memory 1204 may be implemented by any type of volatile or non-volatile storage device or aa, combination thereof. The volatile or non-volatile storage device includes but not limited to: a Random Access Memory (RAM), a Read-Only Memory (ROM), an Erasable Programmable Read-Only Memory (EPROM), an Electrically Erasable Programmable Read-Only Memory (EEPROM), a flash memory or other solid-state storage technology, a Compact Disc Read-Only Memory (CD-ROM), a Digital Video Disc (DVD) or other optical storage devices, a cassette, a magnetic tape, a magnetic disk storage or other magnetic storage devices.

Embodiments of the present disclosure further provide a communication device. The communication device includes: a processor and a memory. The memory stores a computer program, and the computer program is loaded and executed by the processor to implement the method for configuring a reference signal at the first terminal side, or the method for configuring a reference signal at the first communication device side, or the method for configuring a reference signal at the second communication device side.

Embodiments of the present disclosure further provide a computer-readable storage medium having stored therein a computer program that, when being executed by a processor of a first terminal, causes the processor to implement the method for configuring a reference signal at the first terminal side.

Embodiments of the present disclosure further provide a computer-readable storage medium having stored therein a computer program that, when being executed by a processor of a first communication device, causes the processor to implement the method for configuring a reference signal at the first communication device side.

Embodiments of the present disclosure further provide a computer-readable storage medium having stored therein a computer program that, when being executed by a processor of a second communication device, causes the processor to implement the method for configuring a reference signal at the second communication device side.

Optionally, the computer readable storage medium may include a ROM, a RAM, a Solid State Drive (SSD), an optical disk, or the like. The RAM may include a Resistive Random Access Memory (ReRAM) and a Dynamic Random Access Memory (DRAM).

Embodiments of the present disclosure further provide a chip, which includes a programmable logic circuit and/or a program instruction to implement the method for configuring a reference signal at the first terminal side when the chip is running on the terminal device.

Embodiments of the present disclosure further provide a chip, which includes a programmable logic circuit and/or a program instruction to implement the method for configuring a reference signal at the first device side when the chip is running on the network device.

Embodiments of the present disclosure further provide a chip, which includes a programmable logic circuit and/or a program instruction to implement the method for configuring a reference signal at the second device side when the chip is running on the terminal device.

Embodiments of the present disclosure further provide a communication device. The communication device includes a processor and a memory. The memory stores a computer program, and the computer program is loaded and executed by the processor to implement the method for configuring a reference signal at the first terminal side, or the method for configuring a reference signal at the first communication device side, or the method for configuring a reference signal at the second communication device side.

The beneficial effects brought by the technical solutions provided by the embodiments of the present disclosure are at least as follows.

The first reference signal for SL positioning is configured. After obtaining the configuration information of the first reference signal, the first terminal can transmit or receive the first reference signal based on the configuration in the communication scenario based on the SL, thereby implementing the positioning technology in the communication scenario based on the SL.

It should be understood that the reference to "indication" in the embodiments of the present disclosure may be a direct indication, may be an indirect indication, or may be indicative of an association. For example, A indicates B, which may mean that A directly indicates B, for example, B may be obtained through A, it may also mean that A indirectly indicates B, for example, A indicates C, and B may be obtained by C, it may also mean that there is an association between A and B.

In the description of the embodiments of the present disclosure, the term "correspondence" may mean that there is a direct correspondence or an indirect correspondence relationship between two objects, it may also mean that there is an association between the two objects, it may also indicate a relationship of indication and being indicated, configuration and being configured, etc.

In the present disclosure, the term "multiple" refers to two or more. The term "and/or" describes the association relationship between associated objects, which means that there may be three relationships, for example, A and/or B may mean that there are three situations: A exists alone, A and B exist at the same time, and B exists alone. The character "/" generally indicates that there is an "or" relationship between the related objects.

In addition, the numbers of operations described in the present disclosure only exemplify a possible sequence of execution of the operations, and in some other embodiments, the above operations may also be performed in a different sequence, such as two operations with different numbers are performed simultaneously, or two operations with different numbers are performed in a reverse sequence to the illustration, which is not limited by the embodiments of the present disclosure.

Those skilled in the art will appreciate that in one or more of the above examples, the functions described in the embodiments of the present disclosure may be implemented in hardware, software, firmware or any combination thereof. When implemented in software, these functions may be stored in a computer readable medium or transmitted as one or more instructions or codes in the computer readable medium. The computer readable medium includes a computer storage medium and a communication medium, and the communication medium includes any medium that facilitates the transfer of a computer program from one place to another. The storage medium may be any available medium accessible to a general-purpose or special-purpose computer.

The above description is only exemplary embodiments of the present disclosure and is not intended to limit the present disclosure. Any modification, equivalent replacement, improvement, etc. made within the spirit and principle of the present disclosure shall fall within the scope of protection of the present disclosure.

The invention claimed is:

1. A method for configuring a reference signal, comprising:

receiving, by a first terminal, first information comprising configuration information of a first reference signal, wherein the first reference signal is a reference signal for Sidelink (SL) positioning, and the configuration information comprises: a start time of transmission of the first reference signal, a resource bandwidth of the first reference signal, a resource identifier (ID) of the first reference signal, a transmission periodicity and offset of the first reference signal, and a number of symbols for the first reference signal per resource for the first reference signal;

receiving, by the first terminal, second information transmitted by a second terminal; and starting to transmit or stopping transmitting, by the first terminal, the first reference signal based on the second information, wherein the second information is carried in Sidelink Control Information (SCI).

2. The method of claim 1, wherein the configuration information further comprises at least one of:

an end time of the transmission of the first reference signal;

a resource set ID of the first reference signal;

a resource repetition factor of the first reference signal;

a muting pattern of the first reference signal;

a number of receiving or transmitting terminals of the first reference signal;

information about receiving or transmitting terminals of the first reference signal;

a type of the first reference signal;

a number of resources for the first reference signal per resource set for the first reference signal;

a number of frequency layers or a frequency layer indicator;

beam directions;

a comb size, a start physical resource block (PRB) and a point A of the first reference signal;

an on or off indicator of the first reference signal; or a measurement gap of the first reference signal.

3. The method of claim 2, wherein the type of the first reference signal comprises at least one of a periodic signal, an aperiodic signal, or a semi-persistent signal.

4. The method of claim 1, further comprising:

receiving or transmitting, by the first terminal, the first reference signal based on the configuration information of the first reference signal.

5. The method of claim 1, wherein configuration of the first reference signal is bound to a receiving or transmitting terminal of the first reference signal, or configuration granularity of the first reference signal is per transmitting or receiving terminal.

6. The method of claim 1, wherein the first reference signal comprises at least one of: a SideLink-Position Reference Signal (SL-PRS), a Channel State Information-Reference Signal (CSI-RS), a Demodulation Reference Signal (DMRS), a Phase Tracking Reference Signal (PTRS), or a System Synchronization Block (SSB).

7. The method of claim 1, wherein, in response to the first information being transmitted by a Location Management Function (LMF), the first information is transmitted through a Long Term Evolution (LTE) Positioning Protocol (LPP);

in response to the first information being transmitted by a first access network device, the first information is carried in at least one of: a Radio Resource Control (RRC) message, a Medium Access Control Control Element (MAC CE), Downlink Control Information (DCI), or pre-configuration information; or in response to the first information being transmitted by the second terminal, the first information is carried in at least one of: a signaling of a PC5 interface (PC5-S), a Radio Resource Control message of the PC5 interface (PC5-RRC), the MAC CE, or the SCI.

8. The method of claim 7, wherein at least one of the following applies:

the pre-configuration information is at least one of: the first information stored in a Subscriber Identity Module (SIM) card of the first terminal or the first information received by the first terminal;

the first access network device comprises at least one of a base station or a Road Side Unit (RSU); or the second terminal comprises at least one of a terminal device or the RSU.

9. The method of claim 1, wherein, the second information is further carried in at least one of: a Radio Resource Control (RRC) message, or a Media Access Control Control Element (MAC CE).

10. The method of claim 1, wherein the second information comprises a type of the first reference signal.

11. The method of claim 1, wherein the second information comprises beam information associated with the first reference signal, and the beam information comprises at least one of: a Demodulation Reference Signal (DMRS), a Phase Tracking Reference Signal (PTRS), a System Synchronization Block (SSB), a Channel State Information-Reference Signal (CSI-RS), or a Positioning Reference Signal (PRS).

12. The method of claim 1, wherein the first reference signal is used for determining at least one of: location information of a target terminal or distance information of the target terminal.

13. A method of configuring a reference signal, comprising:

transmitting, by a first communication device, first information comprising configuration information of a first reference signal to a first terminal, wherein the first reference signal is a reference signal for Sidelink (SL) positioning, and the configuration information comprises: a start time of transmission of the first reference signal, a resource bandwidth of the first reference signal, a resource identifier (ID) of the first reference signal, a transmission periodicity and offset of the first reference signal, and a number of symbols for the first reference signal per resource for the first reference signal; or transmitting, by the first communication device, second information to the first terminal, wherein the second information enables the first terminal to start to transmit or stop transmitting the first reference signal based on the second information, and the second information is carried in Sidelink Control Information (SCI).

14. The method of claim 13, wherein the configuration information further comprises at least one of:

an end time of the transmission of the first reference signal;

a resource set ID of the first reference signal;

a resource repetition factor of the first reference signal;

a muting pattern of the first reference signal;

a number of receiving or transmitting terminals of the first reference signal;

information about receiving or transmitting terminals of the first reference signal;

a type of the first reference signal;

a number of resources for the first reference signal per resource set for the first reference signal;

a number of frequency layers or a frequency layer indicator;

beam directions;

a comb size, a start physical resource block (PRB) and a point A of the first reference signal;

an on or off indicator of the first reference signal; or a measurement gap of the first reference signal.

15. The method of claim 13, wherein transmitting, by the first communication device, the first information comprises:

in response to the first communication device being a Location Management Function (LMF), transmitting, by the LMF, the first information through a Long Term Evolution (LTE) Positioning Protocol (LPP); or in response to the first communication device being a first access network device, carrying, by the first access network device, the first information in at least one of: a Radio Resource Control (RRC) message, a Medium Access Control Control Element (MAC CE), Downlink Control Information (DCI) or pre-configuration information and transmitting the first information; or in response to the first communication device being a second terminal, carrying, by the second terminal, the first information in at least one of: a signaling of a PC5 interface (PC5-S), a Radio Resource Control message of the PC5 interface (PC5-RRC), the MAC CE, or the SCI and transmitting the first information.

16. The method of claim 13, wherein the first reference signal is used for determining at least one of: location information of a target terminal or distance information of the target terminal.

17. A first terminal comprising:

a processor; and a memory configured to store a computer program executable by the processor;

wherein the processor is configured to execute the computer program to cause the first terminal to:

receive first information comprising configuration information of a first reference signal, wherein the first reference signal is a reference signal for Sidelink (SL) positioning, and the configuration information comprises: a start time of transmission of the first reference signal, a resource bandwidth of the first reference signal, a resource identifier (ID) of the first reference signal, a transmission periodicity and offset of the first reference signal, and a number of symbols for the first reference signal per resource for the first reference signal;

receive second information transmitted by a second terminal; and start to transmit or stop transmitting the first reference signal based on the second information, wherein the second information is carried in Sidelink Control Information (SCI).

18. The first terminal of claim 17, wherein the configuration information further comprises at least one of:

an end time of the transmission of the first reference signal;

a resource set ID of the first reference signal;

a resource repetition factor of the first reference signal;

a muting pattern of the first reference signal;

a number of receiving or transmitting terminals of the first reference signal;

information about receiving or transmitting terminals of the first reference signal;

a type of the first reference signal;

a number of resources for the first reference signal per resource set for the first reference signal;

a number of frequency layers or a frequency layer indicator;

beam directions;

a comb size, a start physical resource block (PRB) and a point A of the first reference signal;

an on or off indicator of the first reference signal; or a measurement gap of the first reference signal.

19. The first terminal of claim 17, wherein the processor is further configured to execute the computer program to cause the first terminal to receive one of:

the first information transmitted by a Location Management Function (LMF);

the first information transmitted by a first access network device; or the first information transmitted by the second terminal.

20. The method of claim 13, wherein in response to the first communication device being a second terminal, the second information is carried in the SCI.

* * * * *